United States Patent [19]

Kriebel et al.

[11] Patent Number: 5,085,675
[45] Date of Patent: Feb. 4, 1992

[54] PROCESS OF REGENERATING A HIGH-BOILING SCRUBBING SOLUTION WHICH CONTAINS $CO_2$ AND $H_2S$

[75] Inventors: Manfred Kriebel, Frankfurt am Main; Gerhard Grünewald, Mainz-Gonsenheim; Hans-J. Fritzsche, Reichelsheim, all of Fed. Rep. of Germany

[73] Assignee: Metallgesellschaft Aktiengesellschaft, Frankfurt am Main, Fed. Rep. of Germany

[21] Appl. No.: 518,639

[22] Filed: May 3, 1990

[30] Foreign Application Priority Data

Jul. 11, 1989 [DE] Fed. Rep. of Germany ....... 3922785

[51] Int. Cl.$^5$ .............................................. B01D 19/00
[52] U.S. Cl. ........................................... 55/44; 55/53; 55/195; 55/196; 423/574 R
[58] Field of Search ................... 55/38, 40, 43, 44, 53, 55/195, 196, 208, 42, 68, 73; 423/220, 567 R, 571, 573.1, 574 R

[56] References Cited

U.S. PATENT DOCUMENTS

| | | | |
|---|---|---|---|
| 2,926,753 | 3/1960 | Kohl et al. | 55/44 |
| 3,324,627 | 6/1967 | Kohrt | 55/40 X |
| 3,594,985 | 7/1971 | Ameen et al. | 55/44 |
| 3,880,615 | 4/1975 | Grunewald et al. | 55/44 |
| 4,834,781 | 5/1989 | Grunewald et al. | 55/44 |

FOREIGN PATENT DOCUMENTS 0054772 6/1982 European Pat. Off. .

Primary Examiner—Richard L. Chiesa
Attorney, Agent, or Firm—Sprung Horn Kramer & Woods

[57] ABSTRACT

A scrubbing solution boiling above 100° C. under atmospheric pressure is used for removing $H_2S$ and $CO_2$ from a gas stream at a temperature from 5° to 70° C. The solution is thus laden with at least $CO_2$ and $H_2S$. For regeneration, the laden scrubbing solution under a pressure of at least 2 bars and at a temperature of at least 60° C. is supplied to an expansion zone and is expanded therein. A flashed-off gas which is rich in $H_2S$ is withdrawn from the expansion zone. The scrubbing solution from the expansion zone is subjected to a hot regeneration, by which the scrubbing solution at a temperature below its boiling temperature is stripped with an inert gas so that its residual loading is substantially removed. Mixed gases which contain inert gas are withdrawn from the hot regeneration and are contacted with scrubbing solution.

7 Claims, 1 Drawing Sheet under atmospheric pressure and has been laden at least with $CO_2$ and $H_2S$ in gas purification at temperatures from 5° to 70° C. and the regenerated scrubbing solution is re-used for gas purification.

PROCESS OF REGENERATING A HIGH-BOILING SCRUBBING SOLUTION WHICH CONTAINS $CO_2$ AND $H_2S$

DESCRIPTION

This invention relates to a process of regenerating a high-boiling scrubbing solution which has been used for gas purification and has a boiling point above 100° C. under atmospheric pressure and has been laden at least with $CO_2$ and $H_2S$ in gas purification at temperatures from 5° to 70° C. and the regenerated scrubbing solution is re-used for gas purification.

The main components of the high-boiling scrubbing solutions to be employed consist, e.g., of N-methylpyrrolidone (NMP) or dimethyl ether of polyethylene glycol (DMPEG). The water content of the scrubbing solutions is relatively low and in most cases below 10% by weight.

In the process of purifying a gas stream which is described in European Patent 0 054 772 the low-boiling scrubbing solution which is laden with $CO_2$ and $H_2S$ is fed through an expansion zone to a re-absorption zone and subsequently to the hot regeneration zone. In the re-absorption zone, part of the $CO_2$ is removed overhead and a gas which is rich in $H_2S$ is withdrawn from the hot regeneration zone and is fed to a Claus process plant. The hot-regenerated scrubbing solution contains methanol as its main constituent and is recycled to the gas scrubber. But high-boiling scrubbing solutions cannot be regenerated as easily as low-boiling scrubbing solutions, such as methanol.

It is an object of the invention to regenerate high-boiling scrubbing solutions in a simple and effective manner and without heating of the scrubbing solution to its boiling point. In the process described first hereinbefore this is accomplished in accordance with the invention in that the laden scrubbing solution having a pressure of at least 2 bars and a temperature of at least 60° C. is expanded into an expansion zone, a flashed-off gas which is rich in $H_2S$ is withdrawn from the expansion zone, the scrubbing solution coming from the expansion zone is subjected to hot regeneration, wherein the scrubbing solution at a temperature below its boiling temperature is stripped with an inert gas to substantially remove the residual loading of the scrubbing solution, and the inert gas-containing mixed gases which have been withdrawn from the hot regeneration are contacted with scrubbing solution.

In the process according to the invention it is readily possible to withdraw from the expansion zone a flashed-off gas which contains at least 50% by volume $H_2S$ and preferably contains in excess of 70% by volume $H_2S$ and such flashed-off gas may be fed to a Claus process plant. In the Claus process plant a mixture of $H_2S$ and $SO_2$ is produced by partial combustion in a manner known per se and is reacted to produce elementary sulfur and water.

In accordance with a further feature of the process, the laden scrubbing solution coming from the gas purification is initially fed to a re-absorption zone, which is also fed with the inert gas-containing mixed gases from the hot regeneration zone, and the scrubbing solution is subsequently fed to the expansion zone. In the re-absorption zone, mainly $CO_2$ is removed from the laden scrubbing solution so that the flashed-off gas which comes from the expansion zone has only a low content of residual $CO_2$ and for this reason can be more easily processed in a Claus process plant.

BRIEF DESCRIPTION OF THE DRAWINGS

Possible embodiments of the process will be explained with reference to the drawing, in which.

DETAILED DESCRIPTION OF PREFERRED EMBODIMENTS

Figure 1:
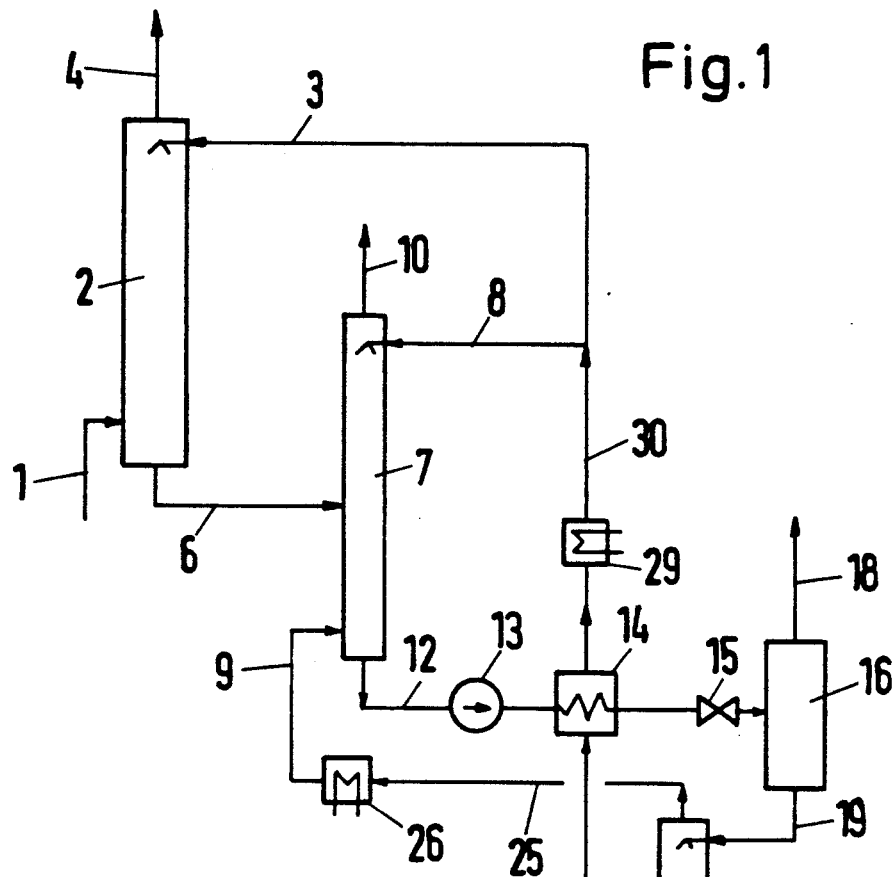
FIG. 1 is a flow scheme of a first embodiment of the process and FIG. 2 is a flow scheme of a second embodiment of the process.

The gas which is to be purified contains $CO_2$ and $H_2S$ and is fed in line 1 to the lower portion of a gas purifier 2, which usually consists of a scrubbing column. High-boiling scrubbing solution is fed to the gas purifier 2 through line 3 and the purified gas is withdrawn in line 4. The gas to be purified may consist, e.g., of raw synthesis gas or of natural gas, although the process is not restricted to the treatment of such gases. In the gas purifier 2 the temperatures are in the range from 5° to 70° C. and the pressure is in most cases in the range from 5 to 100 bars.

Scrubbing solution laden with $CO_2$ and $H_2S$ is withdrawn in line 6 and is preferably first fed to a re-absorption zone 7. Regenerated scrubbing solution is fed via line 8 to the top of the re-absorption zone. Mixed gases which contain an inert gas and are rich in $H_2S$ are fed via line 9 to the lower portion of the zone 7. In the re-absorption zone 7, those mixed gases act mainly as a stripping gas for removing $CO_2$ from the scrubbing solution which is fed in line 6. Owing to the regenerated scrubbing solution fed via line 8, the mixed gases withdrawn in line 10 are virtually free of $H_2S$ and for this reason may be discharged into the atmosphere or combined with the scrubbed gas in line 4.

The scrubbing solution leaves the re-absorption zone 7 through line 12 and is fed by the pump 13 first through a heat exchanger 14 and is heated up therein and then enters through an expansion valve 15 an expansion vessel 16. Because the scrubbing solution is expanded through the expansion valve 15 into the vessel 16, a flashed-off gas is released, which is rich in $H_2S$ and is present in line 18 under a pressure of 1 to 6 bars and can be supplied to a Claus process plant, not shown. In the Clause process plant, elementary sulfur can be recovered in a manner known per se. For the Claus process the gas to be processed should contain $H_2S$ in the highest possible concentration. The flashed-off gas withdrawn in line 18 usually contains at least 50% by volume, in most cases at least 70% by volume $H_2S$. For this reason part of the $H_2S$ content has been removed from the scrubbing solution which is withdrawn in line 19 from the expansion vessel 16.

For a complete regeneration, the scrubbing solution is fed in line 19 to a hot regeneration zone 20, in which the scrubbing solution is heated and stripped with an inert gas to remove residual $H_2S$ and $CO_2$. Heating is effected in a manner known per se by a heater 21. For a simultaneous stripping, inert gas is fed via line 23 to the hot regeneration zone 20. That stripping gas may consist, e.g., of nitrogen or of a partial stream of the pure gas in line 4.

Mixed gases, which contain inert gas, are withdrawn in line 25 from the hot regeneration zone 20 and are passed through a cooler 26 and are then fed in line 9 to the re-absorption column 7. Regenerated scrubbing solution flows in line 27 through the pump 28 first to the heat exchanger 14 and is cooled therein to temperatures not in excess of 70° C. The scrubbing solution is then supplied through a further cooler 29 and through line 30 to flow in part through line 8 to the re-absorber 7 whereas a major part is supplied in line 3 to the gas purifier 2. The re-absorption column 7 and the hot regeneration zone 20 contain packing material known per se or plates which are permeable to liquid so that the mass transfer will be increased.

Figure 2:
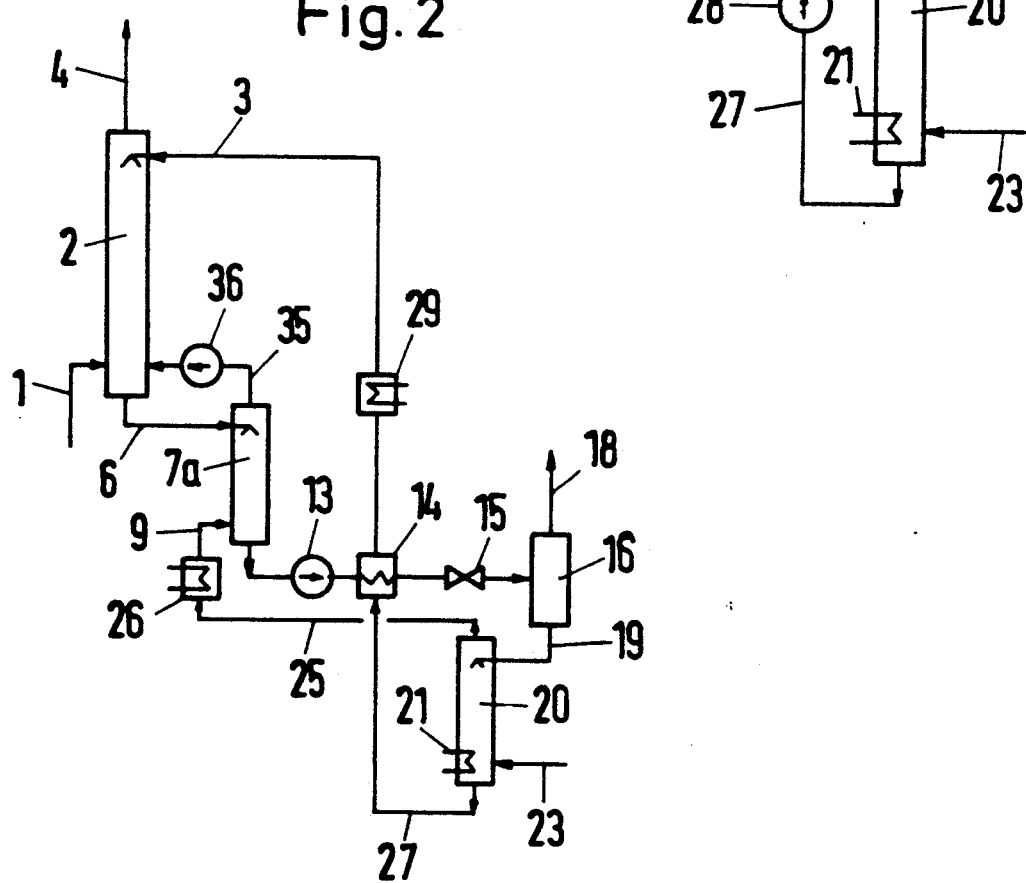

The embodiment of the process which is illustrated in FIG. 2 differs from the process of FIG. 1 in that the re-absorber 7a does not have a top portion that is supplied with regenerated scrubbing solution. As a result, the exhaust gas which is withdrawn in line 35 still has a certain $H_2S$ content and is fed by the fan 36 to the gas purifier 2. The remaining details of the process illustrated in FIG. 2 are the same as in the process of FIG. 1; this is indicated by the use of identical reference numerals.

The re-absorber 7a may be entirely omitted. In that case the line 9 in the process system of FIG. 2 is connected to the fan 36 and the line 6 is connected to the pump 13. But the re-absorber 7 shown in FIG. 1 or 7a shown in FIG. 2 has the advantage that a flashed-off gas which is rich in $H_2S$ and has only a low $CO_2$ content can be withdrawn without a need for expensive equipment.

EXAMPLE

In a process as illustrated in FIG. 2, the gas purifier 2 may be supplied through line 1 at a rate of 10,000 kilomoles per hour with mixed gases consisting of a valuable gas, $CO_2$ and $H_2S$ and said mixed gases may be scrubbed with 300 m$^3$ NMP scrubbing solution per hour. This will result in the various lines in the calculated gas rates stated in the Table.

| Line | 1 | 4 | 6 | 9 | 12 | 18 | 23 | 25 | 35 |
|---|---|---|---|---|---|---|---|---|---|
| Valuable gas | 8260 | 8260 | 18 | — | — | — | — | — | 18 |
| $CO_2$ | 1650 | 1648.5 | 205 | — | 1.5 | 1.5 | — | — | 203.5 |
| $H_2S$ | 90 | — | 133 | 57 | 147 | 90 | — | 57 | 43 |
| $N_2$ | — | 259.5 | — | 260 | 0.5 | 0.5 | 260 | 260 | 259.5 |

All rates are calculated in kilomoles per hour. The valuable gas may consist, e.g., of hydrogen or methane or of a mixture of $H_2$ and CO.

The pressures and temperatures are as follows:

| | Pressure | Temperature |
|---|---|---|
| In the gas purifier 2 | 30 bars | 25° C. |
| in line 35 | 1.1 bars | 25° C. |
| in line 9 | 1.2 bars | 25° C. |
| before the expansion valve 15 | 5 bars | 110° C. |
| in line 18 | 2.4 bars | 25° C. |
| in the hot regeneration zone 20 | 1.6 bars | 120° C. |

After the hot regeneration effected by heating and stripping, the scrubbing solution in line 27 is at a temperature of 120° C. and is supplied at 20° C. in line 3 to the gas purifier 2.

It will be understood that the specification and examples are illustrative but not limitative of the present invention and that other embodiments within the spirit and scope of the invention will suggest themselves to those skilled in the art.

What is claimed is:

1. In the purification of a gas containing $CO_2$ and $H_2S$ wherein the gas is purified at a temperature from about 5° C. to 70° C. with a scrubbing solution having a boiling point above about 100° C. at atmospheric pressure to produce a purified gas and a spent scrubbing solution, said spent scrubbing solution being treated in a re-absorption zone and mixed gases are withdrawn from said zone, the spent scrubbing solution withdrawn from said zone being fed to an expansion zone, the solution fed to the expansion zone having a temperature of at least about 60° C. and a pressure of at least 2 bars, expanding the scrubbing solution into the expansion zone thereby to flash off a gas which is rich in $H_2S$, withdrawing the flashed-off gas from the expansion zone, subjecting the scrubbing solution coming from the expansion zone to hot regeneration by stripping the scrubbing solution at a temperature below its boiling temperature with an inert gas substantially to remove the residual loading of the scrubbing solution, withdrawing regenerated scrubbing solution from said regeneration and recycling at least a portion thereof to said purification, withdrawing inert gas-containing mixed gases from said regeneration and feeding said mixed gases into said re-absorption zone.

2. A process according to claim 1, wherein the flashed-off gas which is rich in $H_2S$ is under a pressure of 1 to 6 bars in the expansion zone.

3. A process according to claim 1, wherein the flashed-off gas withdrawn from the expansion zone contains at least about 50% by volume $H_2S$.

4. A process according to claim 1, wherein a partial stream of the hot-regenerated scrubbing solution is fed to the re-absorption zone.

5. A process according to claim 1, wherein exhaust gas withdrawn from the re-absorption zone is fed to the initial gas purification.

6. A process according to claim 1, wherein the flashed-off gas which is rich in $H_2S$ is fed to a Claus process plant for producing elementary sulfur.

7. In the purification of a gas containing $CO_2$ and $H_2S$ wherein the gas is purified at a temperature from about 5° C. to 70° C. with a scrubbing solution having a boiling point above about 100° C. at atmospheric pressure to produce a purified gas and a spent scrubbing solution, said spent scrubbing solution being treated in a re-absorption zone and mixed gases are withdrawn from said zone, the spent scrubbing solution withdrawn from said zone being fed to an expansion zone, the solution fed to the expansion zone having a temperature of at least about 60° C. and a pressure of at least 2 bars, expanding the scrubbing solution into the expansion zone thereby to flash off a gas which is rich in $H_2S$, withdrawing the flashed-off gas from the expansion zone, subjecting the scrubbing solution coming from the expansion zone to hot regeneration by stripping the scrubbing solution at a temperature below its boiling temperature with an inert gas substantially to remove the residual loading of the scrubbing solution, withdrawing regenerated scrubbing solution from said regeneration and recycling at least a portion thereof to said purification, withdrawing inert gas-containing mixed gases from said regeneration and feeding said mixed gases into the initial gas purification zone.

* * * * *